US012336003B2

(12) United States Patent
Höglund et al.

(10) Patent No.: US 12,336,003 B2
(45) Date of Patent: Jun. 17, 2025

(54) EARLY INDICATION FOR REDUCED CAPABILITY DEVICES

(71) Applicant: Telefonaktiebolaget LM Ericsson (publ), Stockholm (SE)

(72) Inventors: Andreas Höglund, Solna (SE); Tuomas Tirronen, Helsinki (FI); Johan Bergman, Stockholm (SE); Sandeep Narayanan Kadan Veedu, Täby (SE); Kittipong Kittichokechai, Järfälla (SE); Yi-Pin Eric Wang, Fremont, CA (US); Henrik Enbuske, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 407 days.

(21) Appl. No.: 17/908,697

(22) PCT Filed: Oct. 13, 2021

(86) PCT No.: PCT/SE2021/051001
§ 371 (c)(1),
(2) Date: Sep. 1, 2022

(87) PCT Pub. No.: WO2022/081071
PCT Pub. Date: Apr. 21, 2022

(65) Prior Publication Data
US 2023/0122456 A1    Apr. 20, 2023

Related U.S. Application Data

(60) Provisional application No. 63/092,738, filed on Oct. 16, 2020.

(51) Int. Cl.
*H04W 74/08*   (2024.01)
*H04L 5/16*   (2006.01)
(Continued)

(52) U.S. Cl.
CPC .......... *H04W 74/0808* (2013.01); *H04L 5/16* (2013.01); *H04W 76/30* (2018.02)

(58) Field of Classification Search
CPC .......... H04W 74/0833; H04W 74/002; H04W 74/0838; H04W 8/26; H04W 8/22;
(Continued)

(56) References Cited

U.S. PATENT DOCUMENTS

2016/0212737 A1    7/2016    Jang et al.
2017/0245210 A1    8/2017    Jang et al.
(Continued)

FOREIGN PATENT DOCUMENTS

WO    2021141527 A1    7/2021

OTHER PUBLICATIONS

3GPP TSG RAN WG1 Meeting #102-e R1-2006406; Title: Framework and principles for reduced capability devices; Agenda Item: 8.6.4; Source: Huawei, HiSiliccon; Document for: Discussion and Decision; Date and Location: Aug. 17-28, 2020, E-meeting; consisting of 4 pages.
(Continued)

*Primary Examiner* — Jung Liu
(74) *Attorney, Agent, or Firm* — Weisberg I.P. Law, P.A.

(57) ABSTRACT

A wireless device determines whether to provide a reduced capability, RedCap, indication via a message 1 of a random access procedure. The wireless device transmits the message 1 based on the determination, and transmits a message 3 of the random access procedure. A RedCap indication is provided via the message 3 at least if a RedCap indication is not provided via the message 1. According to some embodiments, the wireless device receives an indication whether the wireless device is to provide a RedCap indication via the message 1, and the determination is based on the received indication. According to some embodiments, the indication
(Continued)

whether the wireless device is to provide a RedCap indication via the message 1 is provided by whether a physical random access channel, PRACH, partition between RedCap wireless devices and other wireless devices is configured.

16 Claims, 6 Drawing Sheets

(51) Int. Cl.
*H04W 74/0808* (2024.01)
*H04W 76/30* (2018.01)

(58) Field of Classification Search
CPC ............ H04W 76/30; H04W 74/0808; H04W 72/0453; H04W 72/51; H04W 74/0836; H04W 72/21; H04L 5/16; H04L 1/1854
See application file for complete search history.

(56) References Cited

U.S. PATENT DOCUMENTS

| | | | |
|---|---|---|---|
| 2017/0311355 A1 | 10/2017 | Yi et al. | |
| 2022/0304074 A1* | 9/2022 | He | H04L 1/189 |
| 2022/0312475 A1* | 9/2022 | He | H04W 74/006 |
| 2023/0072513 A1* | 3/2023 | Fang | H04W 72/0446 |
| 2023/0140310 A1* | 5/2023 | Koskinen | H04L 5/0064 |
| | | | 370/329 |
| 2023/0156752 A1* | 5/2023 | Tuong Tran | H04W 72/1273 |
| | | | 370/329 |
| 2023/0156782 A1* | 5/2023 | Li | H04W 74/004 |
| | | | 370/329 |
| 2023/0180273 A1* | 6/2023 | Lu | H04L 1/1854 |
| 2023/0189234 A1* | 6/2023 | Hou | H04W 72/0453 |
| | | | 370/329 |
| 2023/0217498 A1* | 7/2023 | Lee | H04W 74/0833 |
| | | | 370/329 |
| 2023/0379904 A1* | 11/2023 | Kim | H04L 1/00 |

OTHER PUBLICATIONS

3GPP TSG RAN Meeting #89e RP-201677 (revision of RP-191386); Title: Revised SID on Study on support of reduced capability NR devices; Source: Ericsson; Document for: Approval; Agenda Item: 9.7.5; Date and Location: Sep. 14-18, 2020, Electronic Meeting; consisting of 4 pages.
3GPP TS 38.331 V16.1.0; 3rd Generation Partnership Project; Technical Specification Group Radio Access Network; NR; Radio Resource (RRC) protocol specification (Release 16); Jul. 2020; consisting of 906 pages.
3GPP TS 38.304 V16.1.0; 3rd Generation Partnership Project; Technical Specification Group Radio Access Network; NR; User Equipment (UE) procedures in Idle mode and RRC Inactive state (Release 16); Jul. 2020; consisting of 39 pages.
3GPP TS 38.213 V16.3.0; 3rd Generation Partnership Project; Technical Specification Group Radio Access Network; NR; Physical layer procedures for control (Release 16); Sep. 2020; consisting of 179 pages.
International Search Report and Written Opinion dated Jan. 14, 2022 for International Application No. PCT/SE2021/051001 filed Oct. 13, 2021; consisting of 11 pages.
3GPP TSG-RAN WG1 Meeting #102-e R1-2005238; Title: Identification and access restriction for RedCap; Agenda Item: 8.6.5; Source: Ericsson; Document for: Discussion; Date and Location: Aug. 17-28, 2020, e-Meeting; consisting of 4 pages.
3GPP TSG-RAN WG2 Meeting#111-e R2-2008192; Title: Summary of offline 110—Identification and access restriction; Agenda Item: 8.12.2.2; Source: Huawei; Document for: Discussion and Decision; Date and Location: Aug. 17-28, 2020, Online; consisting of 20 pages.
3GPP TSG RAN WG1 #102 R1-2006287; Title: Discussion on Framework and Principles for Reduced Capability; Agenda Item: 8.6.4; Source: Spreadtrum Communications; Document for: Discussion and decision; Date and Location: Aug. 17-28, 2020, e-Meeting; consisting of 2 pages.
3GPP TSG RAN WG1 #102-e R1-2006687; Title: Access restriction for reduced capability NR devices; Agenda Item: 3.6.5; Source: InterDigital, Inc.; Document for: Discussion; Date and Location: Aug. 17-28, 2020, e-Meeting; consisting of 3 pages.
3GPP TSG RAN WG1 Meeting #102-e R1-2006310; Title: Support and control of initial cell access for reduced capability NR devices; Agenda Item: 8.6.5; Source: LG Electronics Inc.; Document for: Discussion and decision; Date and Location: Aug. 17-28, 2020, Online; consisting of 4 pages.
3GPP TSG RAN WG1 #102-e R1-2005386; Title: Framework and Principles for Reduced Capability NR devices; Source: vivo, Guangdong Genius; Agenda Item: 8.6.4; Document for: Discussion and Decision; Date and Location: Aug. 17-28, 2020, e-Meeting; consisting of 5 pages.
3GPP TSG RAN WG1#71 R1-124993; Title: Discussion on Coverage Enhancement for a low-cost MTC UE; Agenda Item: 6.3.3; Source: LG Electronics; Document for: Discussion and decision; Location and Date: New Orleans, USA, Nov. 12-16, 2012, consisting of 5 pages.

* cited by examiner

FIG. 9

EARLY INDICATION FOR REDUCED CAPABILITY DEVICES

CROSS-REFERENCE TO RELATED APPLICATIONS

This application is a Submission Under 35 U.S.C. § 371 for U.S. National Stage Patent Application of International Application No.: PCT/SE2021/051001, filed Oct. 13, 2021 entitled "EARLY INDICATION FOR REDUCED CAPABILITY DEVICES," which claims priority to U.S. Provisional Application No. 63/092,738, filed Oct. 16, 2020, entitled "EARLY INDICATION FOR REDUCED CAPABILITY NR DEVICES," the entireties of both of which are incorporated herein by reference.

TECHNICAL FIELD

The present disclosure relates to wireless communications, and in particular, to a reduced capability (RedCap) indication.

BACKGROUND 5G is the fifth generation of cellular wireless communication technology and was introduced in Third Generation Partnership Project (3GPP) Release 15. 5G is designed to help increase speed, reduce latency, and improve flexibility of wireless services. The 5G system (5GS) includes both a new radio access network (NG-RAN) which makes use of a new air interface called New Radio (NR), and a new core network (5GC).

The initial release of 5G in 3GPP Release 15 is optimized for mobile broadband (MBB) and ultra-reliable and low latency communication (URLLC). These services require very high data rates and/or low latency and therefore put high requirements on the wireless device. To enable 5G to be used for other services with more relaxed performance requirements, a new low complexity wireless device type is introduced in 3GPP Release 17 (see RP-201677, Revised SID on Study on support of reduced capability NR devices, Ericsson, 3GPP TSG RAN Meeting #89e, September 2020). This low complexity wireless device type is referred to as reduced capability (RedCap) wireless devices, or NR RedCap user equipments (NR RedCap UEs). The reduced capability (RedCap) wireless device type is particularly suited for machine type communication (MTC) services such as wireless sensors or video surveillance, but it can also be used for MBB services with lower performance requirements such as wearables. The low complexity wireless device has reduced capabilities compared to 3GPP Release 15 NR wireless devices, for instance, the low complexity wireless device has:

Reduced wireless device bandwidth
Reduced number of wireless device RX/TX antennas
Half duplex FDD
Relaxed wireless device processing time
Relaxed wireless device processing capability Because of the reduced capabilities, the low complexity wireless device is sometimes also referred to as an NR RedCap wireless device. An NR RedCap wireless device may have some or all of the reduced capabilities above.

From the operator side/perspective it may be important that the low complexity wireless devices are only used for their intended use cases. To enforce this requirement, the network may be required to identify the low complexity wireless devices and be able to restrict their access when necessary. This is described in a 3GPP study item description for the low complexity wireless device (see RP-201677, Revised SID on Study on support of reduced capability NR devices, Ericsson, 3GPP TSG RAN Meeting #89e, September 2020) as:

Study standardization framework and principles for how to define and constrain such reduced capabilities—considering definition of a limited set of one or more device types and considering how to ensure those device types are only used for the intended use cases.

Study functionality that will allow devices with reduced capabilities to be explicitly identifiable to networks and network operators, and allow operators to restrict their access, if desired.

In 3GPP, early indication that the wireless device is a RedCap device has been discussed for both the above reasons, i.e., to be able to schedule the wireless device according to its lower capabilities and to be able to restrict the access according to the objective above. RAN1 has discussed whether to have an indication in Msg1, Msg3, or Msg5 or later. For example, the following has been proposed regarding uplink (UL) initial BWP/RACH (bandwidth part/random access channel) resources (see R1-2006406, Framework and principles for reduced capability devices, Huawei et al, 3GPP TSG RAN WG1 Meeting #102-e, August 17-28, 2020):

Currently, the bandwidth of the uplink initial bandwidth part (BWP) for normal wireless devices can be configured by SIB1 flexibly and the maximum bandwidth can be 100 MHz in FR1. A larger initial UL BWP can benefit from scheduling flexibility, Msg3 frequency hopping as well as transmission capacity for legacy wireless devices. However, if sharing UL initial BWP between RedCap wireless devices and normal, i.e., non-RedCap, wireless devices, the bandwidth of UL initial BWP may need to be restricted within a bandwidth no larger than the RedCap channel bandwidth (i.e., 20 MHz). Therefore, from the aspect of no impact on normal wireless device performance, a dedicated UL initial BWP specific to RedCap wireless devices is preferable. However, whether to share the UL initial BWP or not can be decided by network or network node. For example, if the bandwidth of UL initial BWP for a normal wireless device which is no larger than 20 MHz can meet the transmission requirement of the normal wireless device, such as the transmission capacity and transmission efficiency, the network node can configure a common UL initial BWP for both the RedCap wireless devices and the normal wireless devices. Otherwise, a RedCap-specific UL initial BWP can be configured.

Additionally, separated RACH resources can be applied to differentiate the RedCap wireless device and the normal wireless device. Therefore, the network node can distinguish the RedCap wireless device and normal wireless device in the early access stage rather than after the phase of wireless device capability reporting, which can be beneficial for the load balance and the scheduling, as well as the compatibility to network nodes which are not able to recognize the wireless device capability signaling specific to 3GPP Rel-17 RedCap wireless devices and may inappropriately configure the RedCap wireless devices. Therefore, the access performance of normal wireless devices can be ensured. On the contrary, if the introduction of the RedCap wireless devices would not impact the performance of the normal wireless devices, such as at the early stage of RedCap development wherein the quantity of RedCap wireless devices may be expected to be small, sharing RACH resources may also be considered.

Proposal: Support dedicated UL initial BWP/RACH resources for RedCap wireless devices. Whether to share UL initial BWP/RACH resources between the RedCap wireless devices and normal wireless devices can be configured by the network.

SUMMARY

Some embodiments advantageously provide methods, systems, and apparatuses for a reduced capability indication in at least one of message 1, Msg1, and message 3, Msg3, during an access procedure.

In one or more embodiments, various methods for combining the RedCap early indication in Msg1 and/or Msg3, e.g., hybrid solutions, are provided where one or more of these methods may be performed in a flexible manner depending on what is beneficial at the moment for the RedCap wireless device, for example.

A first aspects provides embodiments of a method implemented in a wireless device. The method comprises determining whether to provide a reduced capability, RedCap, indication via a message 1 of a random access procedure. The method further comprises transmitting the message 1 based on the determination, and transmitting a message 3 of the random access procedure. A RedCap indication is provided via the message 3 at least if a RedCap indication is not provided via the message 1.

Corresponding embodiments of a wireless device are also provided.

A second aspect provides embodiments of a method implemented in a network node. The method comprises receiving a message 1 of a random access procedure, and receiving a message 3 of the random access procedure. The method further comprises performing at least one action based on a reduced capability, RedCap, indication provided via the message 1 and/or the message 3. A RedCap indication is provided via the message 3 at least if a RedCap indication is not provided via the message 1.

Corresponding embodiments of a network node are also provided.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

As described above in the background section, it has been discussed in 3GPP whether to have a RedCap indication in Msg1, Msg3, or Msg5 or later. Although several options for how to provide RedCap indication have been discussed, 3GPP has not agreed on a solution, so it is unclear how RedCap indications are supposed to work.

The present disclosure advantageously adresses at least one of the problems with existing systems at least in part by providing one or more methods for combining the RedCap early indication in Msg1 and Msg3, e.g., hybrid solutions, and also do to this in a flexible manner depending on what is beneficial at the moment, as described herein. That is, one or more arrangements described herein advantageously provide benefits of early indication in Msg1 and in Msg3.

Before describing in detail exemplary embodiments, it is noted that the embodiments reside primarily in combinations of apparatus components and processing steps related to providing a RedCap indication in at least one of Msg1 and Msg3. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). In one or more embodiments, WD may refer to a reduced capability (RedCap) WD that has reduced capability compared to a "normal" wireless device (e.g., 3GPP release 15 wireless device). Where reduced capability may refer to one or more of: reduced wireless device bandwidth, reduce number of wireless device transmit/receive antennas, half duplex frequency division duplex, relaxed (i.e., less strict) wireless device processing time, and relaxed (i.e., less strict) wireless device processing capability, etc.

The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP Long Term Evolution (LTE) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide a RedCap indication in at least one of Msg1 and Msg3 as described herein.

Figure 1:
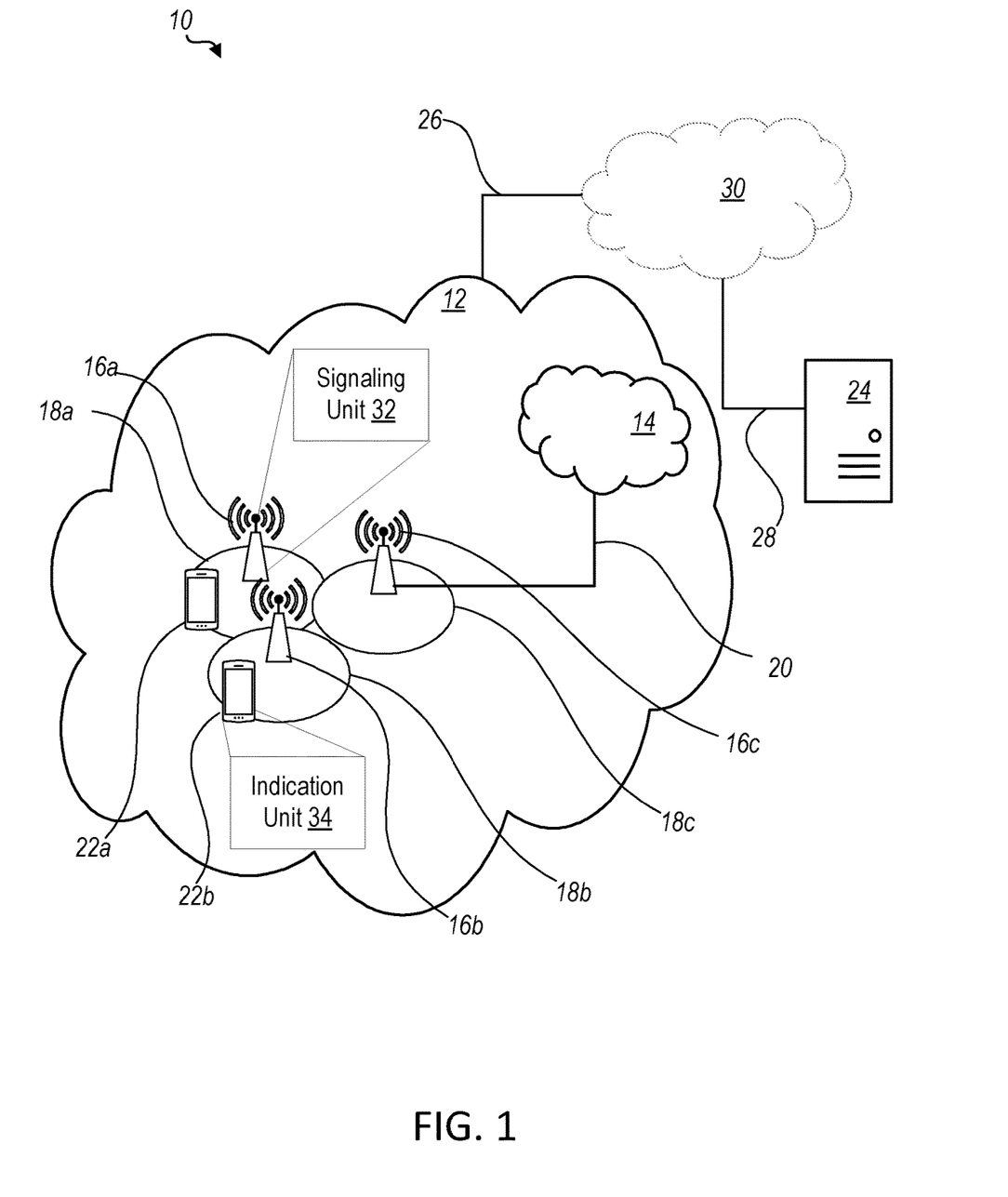
FIG. 1 is a schematic diagram of an exemplary network architecture illustrating a communication system connected via an intermediate network to a host computer according to the principles in the present disclosure.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. Further, WD 22 may refer to a "normal" or non-RedCap WD 22 or a RedCap WD 22.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a signaling unit 32 which is configured to perform one or more network node 16 functions described herein such as with respect to a RedCap indication. A wireless device 22 is configured to include an indication unit 34 which is configured to perform one or more wireless device 22 functions described herein such as with respect to a RedCap indication.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RANI (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include an information unit 54 configured to enable the service provider to provide, determine, process, analyze, store, forward, relay, transmit, receive, etc. information related to an early RedCap indication.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more radio frequency (RF) transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include signaling unit 32 configured to perform one or more network node 16 functions described herein such as with respect a RedCap indication.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an indication unit 34 configured to perform one or more wireless device 22 functions described herein such as with respect to a RedCap indication. In some embodiments, the inner workings of the network node 16, WD 22, and host computer 24 may be as shown in FIG. 2 and independently, the surrounding network topology may be that of FIG. 1.

Figure 2:
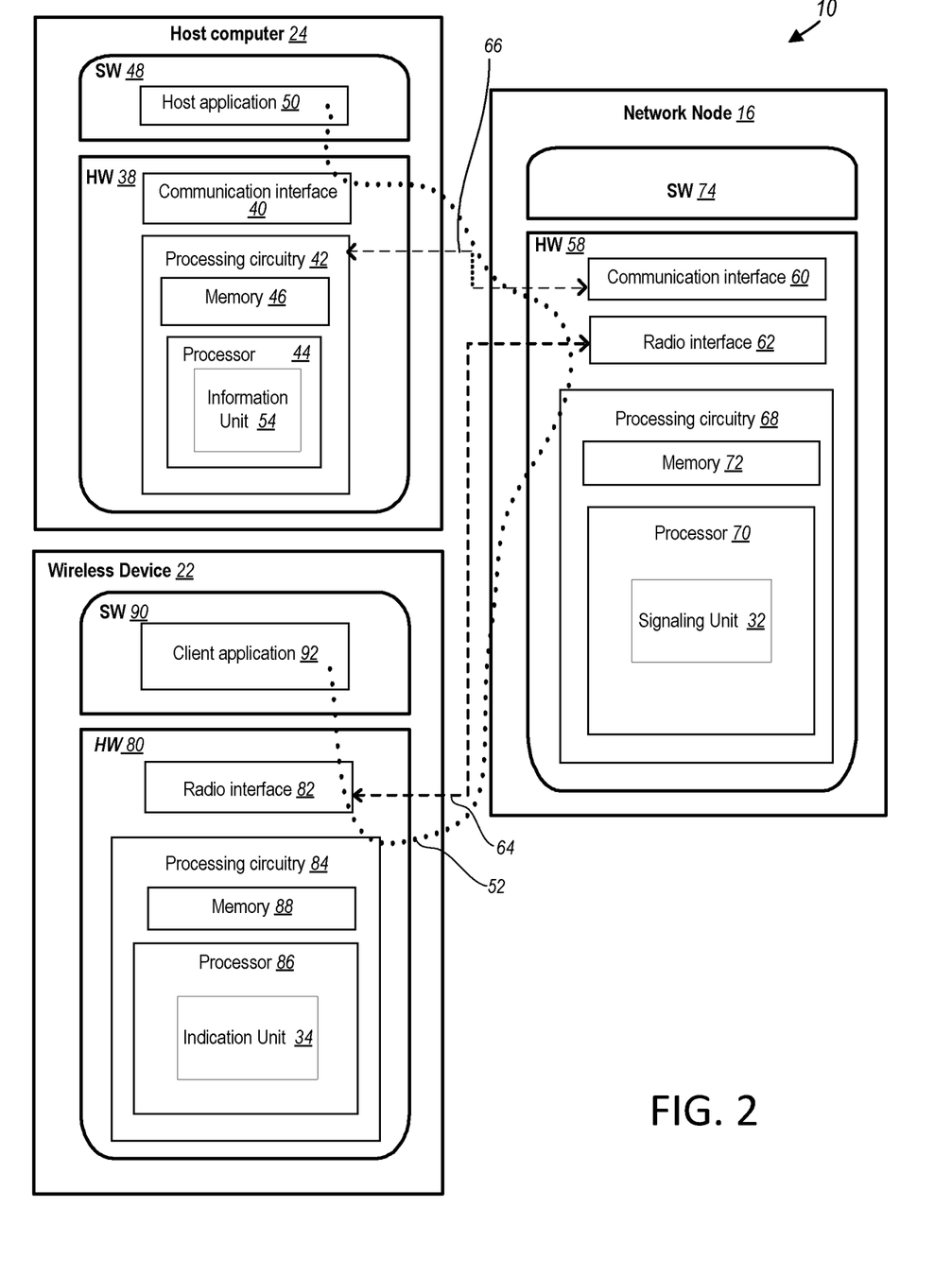
FIG. 2 is a block diagram of a host computer communicating via a network node with a wireless device over an at least partially wireless connection according to some embodiments of the present disclosure.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as signaling unit 32, and indication unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
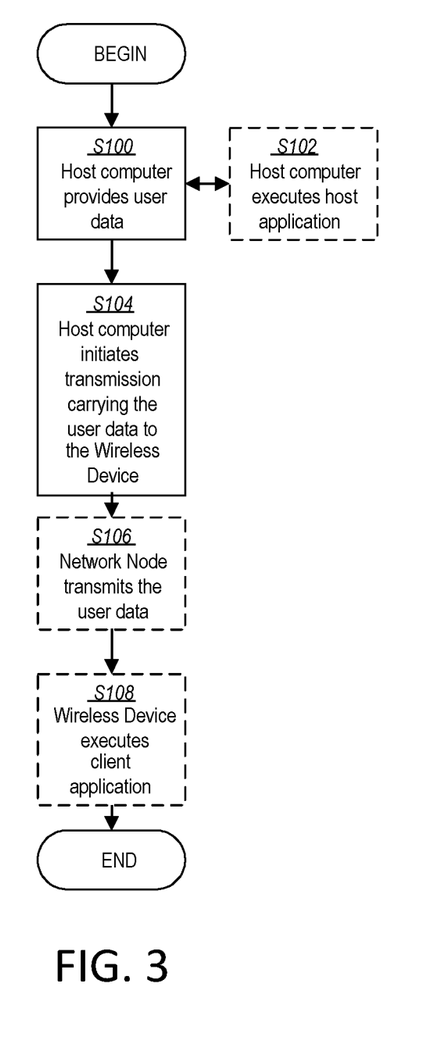
FIG. 3 is a flowchart illustrating exemplary methods implemented in a communication system including a host computer, a network node and a wireless device for executing a client application at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 4:
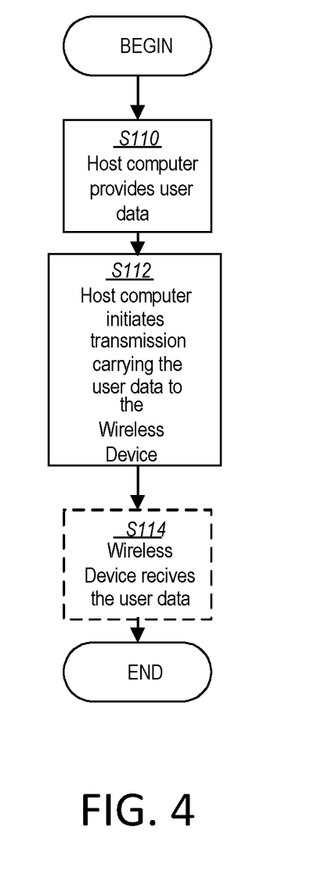
FIG. 4 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
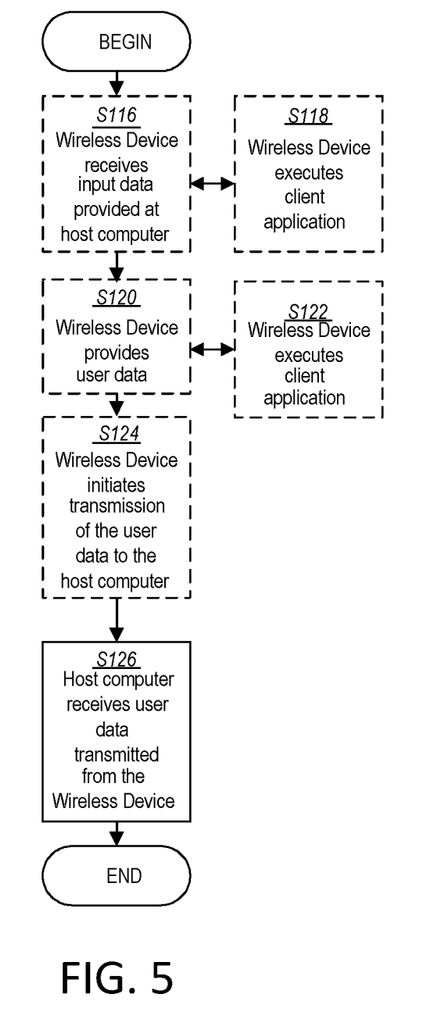
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
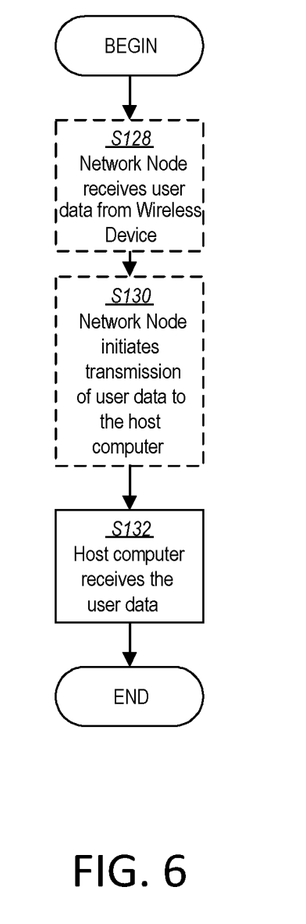
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
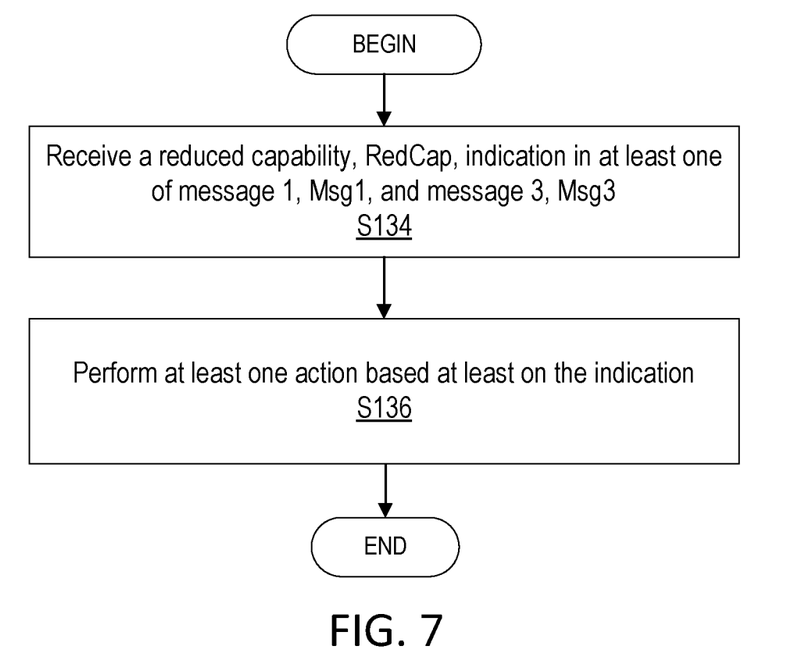
FIG. 7 is a flowchart of an exemplary process in a network node according to some embodiments of the present disclosure.

FIG. 7 is a flowchart of an exemplary process in a network node 16 according to some embodiments of the present disclosure. One or more Blocks and/or functions performed by network node 16 may be performed by one or more elements of network node 16 such as by signaling unit 32 in processing circuitry 68, processor 70, radio interface 62, etc. In one or more embodiments, network node 16 such as via one or more of processing circuitry 68, processor 70, signaling unit 32, communication interface 60 and radio interface 62 is configured to receive (Block S134) a reduced capability, RedCap, indication in at least one of message 1, Msg1, and message 3, Msg3, as described herein. In one or more embodiments, network node 16 such as via one or more of processing circuitry 68, processor 70, signaling unit 32, communication interface 60 and radio interface 62 is configured to perform (Block S136) at least one action based at least on the indication, as described herein.

According to one or more embodiments, the processing circuitry 68 is configured to indicate, in system information, SI, that RedCap physical random access channel, PRACH, resources have been configured. According to one or more embodiments, if the indication is received in Msg1, one of: receiving the indication in the Msg3 indicates a RedCap type; and failing to receive the Msg3 indicates the wireless device is a non-RedCap wireless device.

Figure 8:
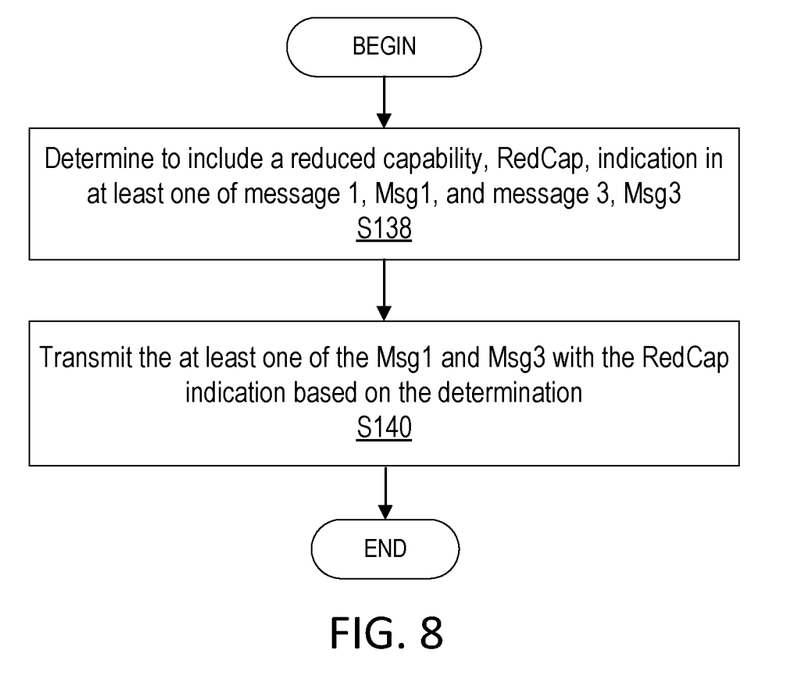
FIG. 8 is a flowchart of an exemplary process in a wireless device according to some embodiments of the present disclosure.

FIG. 8 is a flowchart of an exemplary process in a wireless device 22 according to some embodiments of the present disclosure. One or more Blocks and/or functions performed by wireless device 22 may be performed by one or more elements of wireless device 22 such as by indication unit 34 in processing circuitry 84, processor 86, radio interface 82, etc. In one or more embodiments, wireless device 22 such as via one or more of processing circuitry 84, processor 86, indication unit 34 and radio interface 82 is configured to determine (Block S138) to include a reduced capability, RedCap, indication in at least one of message 1, Msg1, and message 3, Msg3, as described herein. In one or more embodiments, wireless device such as via one or more of processing circuitry 84, processor 86, indication unit 34 and radio interface 82 is configured to transmit (Block S140) the at least one of the Msg1 and Msg3 with the RedCap indication based on the determination, as described herein.

According to one or more embodiments, the determination to include the RedCap indication in at least one of Msg1 and Msg3 is based on a predefined criterion where the predefined criterion including at least one of: whether radio frequency, RF, returning is needed at the wireless device; based at least on a number of synchronization signal blocks, SSBs, per random access channel occasion, RO; a quantity of contention-based (CB) preambles per SSB; and a coverage estimation. According to one or more embodiments, the processing circuitry 84 is configured to receive an indication whether to the wireless device 22 is to transmit the RedCap indication in the one of the Msg1 and Msg3, the indication being provided by one of: whether a physical random access channel, PRACH, partition for RedCap wireless devices has been configured; and system information, SI.

Having generally described arrangements for a RedCap indication in at least one of Msg1 and Msg3, details for these arrangements, functions and processes are provided as follows, and which may be implemented by the network node 16, wireless device 22 and/or host computer 24.

Embodiments provide a RedCap indication in at least one of Msg1 and Msg3, as described herein. Msg1 and Msg3 may refer to message 1 and message 3 of a random access procedure. In one or more embodiments, an indication that the cell provided by network node 16 supports RedCap may be indicated in SI, either explicit or implicit via, e.g., configuration parameters. In one example, it is implicit from the presence of a PRACH partition for RedCap whether the wireless device 22 may use an early RedCap indication in a Msg1 indication or use the early RedCap indication later in Msg3. In one example, the network node 16, such as via one or more of processing circuitry 68, processor 70, radio interface 62, signaling unit 32, etc., may configure separate PRACH resources for RedCap and "legacy" wireless devices 22, where RedCap wireless devices 22, such as via one or more of processing circuitry 84, processor 86, radio interface 82, indication unit 34, etc., may select a PRACH resource from the pool configured for RedCap to indicate it is a RedCap wireless device 22 in Msg1. Msg1 indication may be needed, e.g., if the initial access procedure (e.g., RACH procedure) and/or scheduling of Msg2 and Msg3 assumes higher wireless device capabilities for "legacy" wireless devices 22 compared to those for RedCap, which is an example of a predefined criterion. If separate PRACH resources for RedCap are not configured (i.e., an example of a predefined criterion), indication in Msg3 is used.

In one or more embodiments, there may always be a RedCap early indication in Msg3. If RedCap PRACH resources, as in the previous embodiment, are configured in SI (i.e., an example of a predefined criterion), then there would also be an early implicit indication through Msg1. If SI does not configure RedCap PRACH resources (i.e., an example of a predefined criterion), RedCap wireless devices 22 such as via one or more of processing circuitry 84, processor 86, radio interface 82, indication unit 34, etc., uses legacy PRACH resources and indication in Msg3 would indicate to the network node 16 that the wireless device 22 is a RedCap wireless device 22.

In one or more embodiments, an indication in Msg3 is implemented, such as via one or more of processing circuitry 84, processor 86, radio interface 82, indication unit 34, etc., as a flag in the radio resource control (RRC) message included in Msg3, e.g., using the spare bit in RRCResumeRequest, RRCResumeRequest1 or RRCSetupRequest messages. A possible issue with this approach is that there is only one spare bit in each of the messages and it may not be desirable to use this last bit.

In another embodiment, the Msg3 contains a new RRC message (i.e., different than listed in the above embodiment) or similar message as RRCResumeRequest or RRCSetupRequest but over a different logical channel, or CCCH channel with larger payload (i.e., "CCCH1" in RRC, "CCCH with 64 byte payload" in MAC). The message contains a flag or field which indicates the wireless device 22 is a RedCap wireless device 22 For example, UL RRC messages over a CCCH1 logical channel are 64 bits, thus it would be possible to use similar message RRCResumeRequest or RRCSetupRequest but over CCCH1, with the additional RedCap indication.

In another embodiment, the flag or field which indicates the wireless device 22 is a RedCap wireless device 22 is not included in the RRC message in Msg3 but is included as a RedCap indication in Msg3 using information from another protocol layer, e.g., by using a MAC control element.

In one or more embodiments, described herein, wireless device 22, such as via one or more of processing circuitry 84, processor 86, radio interface 82, indication unit 34, etc., configures and transmits Msg1 and/or Msg3, as described herein.

In one or more embodiments, if the RedCap wireless device 22 has higher capabilities compared to the minimum required for RedCap such that it is capable of the legacy initial access procedure (e.g., initial RACH procedure) configured in the cell, even if there are separate RedCap PRACH resources configured, the RedCap wireless device 22 such as via one or more of processing circuitry 84, processor 86, radio interface 82, indication unit 34, etc., can choose/determine to select a legacy PRACH resource for initial access and only include the RedCap early indication in Msg3. Further, the network node 16 such as via one or more of processing circuitry 68, processor 70, radio interface 62, signaling unit 32, etc., could, in SI, broadcast the minimum requirements for using the legacy PRACH resources for initial access, e.g., required minimum device bandwidth, receiver antennas, etc.

In one or more embodiments, the PRACH resources for Msg1 indication are configured in SI and a possibility to use Msg3 indication is also specified, e.g., as mentioned in an above embodiment, i.e., different permutations of the Msg1 and Msg3 early indications can be used to indicate one of several RedCap types (e.g., up to 4). A RedCap wireless device 22 is expected to use a Msg1 indication, and the presence of a Msg3 indication further determines how the network node 16 interprets the wireless device 22's intentions and/or RedCap type: in one embodiment, if both Msg1 and Msg3 indications are present, the network node 16 interprets the wireless device 22 to be of RedCap wireless device 22 type 1 and if Msg1 indication is present but Msg3 indication is not present, the network node 16 interprets the wireless device 22 to be of RedCap wireless device 22 type 2 which is different from the RedCap wireless device type 1.

In one embodiment, if the wireless device 22 such as via one or more of processing circuitry 84, processor 86, radio interface 82, indication unit 34, etc., indicates it is a RedCap wireless device 22 in Msg1 but does not indicate it is a RedCap wireless device 22 in Msg3, the network node 16 such as via one or more of processing circuitry 68, processor 70, radio interface 62, signaling unit 32, etc., assumes this is an erroneous procedure and rejects the wireless device 22's request for RRC connection or resumption.

In one embodiment, if the wireless device 22 such as via one or more of processing circuitry 84, processor 86, radio interface 82, indication unit 34, etc., indicates it is a RedCap wireless device 22 in Msg1 but does not indicate it is a RedCap wireless device 22 in Msg3, the network node 16 such as via one or more of processing circuitry 68, processor 70, radio interface 62, signaling unit 32, etc., assumes the wireless device 22 is a "normal" wireless device 22, that is, not a RedCap wireless device 22 and continues with procedures assuming existing NR behavior and/or that the wireless device supports mandatory NR wireless device 22 capabilities.

In one embodiment, the wireless device 22 is assigned, by network node 16, with an additional Bandwidth Part (BWP) different than the initial BWP, by, for example, in system information or by signaling a dedicated RRC configuration in RRC CONNECTED mode. The initial BWP can be set as the default BWP or other. The additional BWP may overlap with the initial BWP in order to facilitate use of either resources in the initial BWP or the other additional active BWP. As a result, only a RedCap wireless device 22 such as via one or more of processing circuitry 84, processor 86, radio interface 82, indication unit 34, etc., using an active BWP other than the initial BWP can be implicitly identified as such. Additionally, this allows configuring, e.g., different sizes of preamble groups in the initial BWP and the active BWP. For example, for a 2-step RA procedure, this may allow a separate (additional) set of preamble group A and B PUSCH (Physical Uplink Shared Channel) resources that may be tailored/configured specifically for RedCap wireless devices 22. The above could be achieved by, for example:

Configuring an active BWP overlapping with an initial BWP;
Configuring a different set of preamble group A and B parameters (e.g., resources)
Allowing connected wireless devices 22 in the active BWP to use the PRACH resources, and/or 2-step RA msgA PUSCH resources, in the initial BWP, without switching to active BWP.

Figure 9:
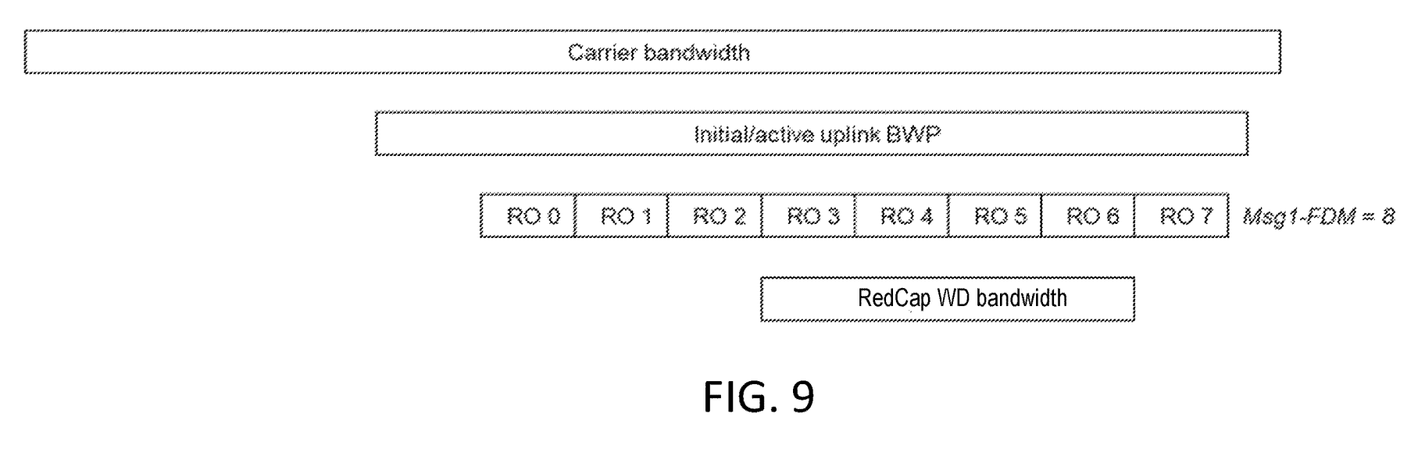
FIG. 9 is a block diagram of a RedCap wireless device bandwidth relative to a carrier bandwidth, initial/active uplink bandwidth part (BWP) and physical random access channel (PRACH) occasions in a frequency domain.

In one embodiment, early the RedCap indication is provided in Msg1 by wireless device 22 if RF retuning is needed at the wireless device 22 to transmit Msg1 (preamble) using the PRACH occasion (RO) corresponding to the wireless device 22's preferred synchronization signal block (SSB), which may be an example of a predefined criterion. The need for RF retuning may depend on the RedCap wireless device 22 bandwidth, preamble sequence length, subcarrier spacing, and number of ROs frequency division multiplexed in the frequency domain, which is given by the higher layer parameter msg1-FDM. An example of this embodiment is as follows. Consider a short preamble, i.e., sequence length=139, and preamble/PUSCH subcarrier spacing of 30 KHz. Therefore, the size of each RO in frequency domain will be $$\left\lceil \frac{139*30}{12*30} \right\rceil = 12$$

resource blocks (RBs). The value of msg1-FDM can be 1, 2, 4 or 8. If msg1-FDM=8, then the ROs in the frequency domain may span 96 RBs. In FR1, if a RedCap wireless device 22 only supports 20 MHz bandwidth (i.e., maximum transmission bandwidth configuration=51 RBs), half of the ROs may be outside of the wireless device 22 bandwidth. FIG. 9 is a diagram of this example illustrating RedCap wireless device 22 bandwidth relative to carrier bandwidth, initial/active uplink bandwidth part (BWP), and PRACH occasions in the frequency domain. These ROs which are outside of the wireless device 22 bandwidth can potentially include the ROs mapped to the wireless device 22's preferred SSB. Consequently, the wireless device 22 may have to perform RF retuning, i.e., retune its center frequency, in order to transmit using the RO associated with the preferred SSB.

In such scenarios, it may be beneficial if an early RedCap indication is provided in Msg1. For instance, after the preamble transmission, the wireless device 22 such as via one or more of processing circuitry 84, processor 86, radio interface 82, indication unit 34, etc., may have to again retune its center frequency to monitor Type1-PDCCH (Type1 Physical Downlink Control Channel) common search space (CSS) in the random access response (RAR) window. If the early RedCap indication is provided in Msg1, the network node 16 such as via one or more of processing circuitry 68, processor 70, radio interface 62, signaling unit 32, etc., can take the RF retuning time into account when transmitting the PDCCH (Physical Downlink Control Channel) to the wireless device 22 (i.e., RedCap wireless device 22) in the RAR window. If RF retuning time is not taken into account, the wireless device 22 such as via one or more of processing circuitry 84, processor 86, radio interface 82, indication unit 34, etc., may fail to receive PDCCH, depending on when the RAR window starts. In one example, the RAR window starts at the first symbol of the earliest control resource set (CORESET) for Type1-PDCCH CSS set, that is, at least one symbol, after the last symbol of the PRACH occasion corresponding to the PRACH transmission.

In one embodiment, the determination of whether to use an early RedCap indication in Msg1 is performed based on the number of SSBs per RO and number of contention-based (CB) preambles per SSB (i.e., an example of a predefined criterion), which are jointly given by the higher layer parameter ssb-perRACH-OccasionAndCB-PreamblesPerSSB in the system information (SI). For instance, if number of SSBs per RO>X1 and/or number of CB preambles per SSB>X2, the wireless device 22 such as via one or more of processing circuitry 84, processor 86, radio interface 82, indication unit 34, etc., may use early RedCap indication in Msg1. Otherwise, the RedCap indication is carried out in Msg3. The description of this embodiment is as follows. According to existing wireless communication standards, the number of SSBs per RO can be ⅛, ¼, ½, 1, 2, 4, 8 or 16. A value <1 implies that one SSB is mapped to multiple consecutive ROs, and a value >1 implies that multiple SSBs are mapped to the same RO. If the number of SSBs per RO is >1, it may not be possible to differentiate normal wireless devices 22 from RedCap wireless devices 22 based on the used RO. Instead, preamble partitioning, i.e., using a predetermined subset from the 64 preambles available in the RO, may have to be used. However, one drawback with this approach is that if the number of SSB per RO is a high value, for example 16, then the number of CB preambles per SSB is only 4. If the 4 preambles are partitioned further for a RedCap indication, this can increase the random access delay for legacy wireless devices 22. Therefore, in such scenarios, it may be beneficial to have the RedCap indication in Msg3. On the other hand, if number of SSBs per RO is ≤1, it can be beneficial to have early RedCap indication in Msg1.

In one example, related to the above embodiment, it may be implicit to the wireless device 22 from the value of ssb-perRACH-OccasionAndCB-PreamblesPerSSB as to whether the wireless device 22 should use early RedCap indication in Msg1 or use early RedCap indication in Msg3, or use both.

In one embodiment, the wireless device 22 is specifically configured by the network node 16 in a connected state (e.g., RRC connected state) as to when to provide a RedCap indication—Msg1 or Msg3 or both. Therefore, in subsequent access from inactive/idle state (e.g., RRC inactive/idle state) based on CB random access, the wireless device 22 such as via one or more of processing circuitry 84, processor 86, radio interface 82, indication unit 34, etc., may apply the configuration for RedCap indication.

In one embodiment, in cases where early RedCap indication in both Msg1 and Msg3 is possible in the cell (e.g., separate PRACH configured for the wireless device 22 and the Msg3 indication is always included), the RedCap wireless device 22 such as via one or more of processing circuitry 84, processor 86, radio interface 82, indication unit 34, etc., may determine whether to use the Msg1 indication or not based on a coverage estimation (i.e., an example of a predefined criterion), e.g., network node 16 coverage estimation. The coverage estimation in the wireless device 22 can, for example, be based on RSRP, SSB, etc. The rationale for this example is that the Msg1 early indication may only be needed if the RedCap wireless device 22 is in poor coverage. For example, since RedCap wireless devices 22 due to the complexity reduction (e.g., fewer Rx antennas, reduced BW, etc.) compared to "normal" wireless devices 22 have reduced link performance, the scheduling of Msg2 and Msg3 may require coverage compensation, where in order to do so, an early RedCap indication in Msg1 may be required. However, if the RedCap wireless device 22 is in a good coverage, based on, for example, a measurement threshold for RSRP being met, the legacy scheduling of Msg2 and Msg3 may be sufficient for the wireless device 22 and no early indication in Msg1 required.

The following can be considered for methods of RedCap indication during Msg3 transmission.

In one or more embodiments, there are two possible timing values for a total slot offset for PUSCH transmission scheduled by the RAR UL grant. The total slot offset is with respect to the slot where the RAR UL grant ends, i.e., for RAR UL grant ending in slot n, Msg3 PUSCH is transmitted in slot n+total slot offset, where total slot offset=$k_2+\Delta$. This can be provided, e.g., by:

including an additional (second) slot offset $k_2$ value which is different from the existing value for one or more entries in the default PUSCH time domain resource allocation table, e.g., Table 6.1.2.1.1-2 or 6.1.2.1.1-3 in 3GPP TS 38.214, or including an additional (second) j value which is different from the existing value for each SCS value in, e.g., Table 6.1.2.1.1-4 in 3GPP TS 38.214, or including an additional (second) $\Delta$ value which is different from the existing value for each SCS value in, e.g., Table 6.1.2.1.1-5 in 3GPP TS 38.214, or including an additional $k_2$ parameter when configuring PUSCH-TimeDomainResourceAllocation which forms a list of PUSCH time domain resource allocation entries in pusch-TimeDomainAllocationList provided in pusch-ConfigCommon IE One or more of the additional (second) values described above can be included as an additional column in one or more of the existing tables listed above, or part of the new, separate tables.

The RedCap wireless device 22, such as via one or more of processing circuitry 84, processor 86, radio interface 82, indication unit 34, etc., indication can be provided implicitly during Msg3 transmission by using the PUSCH time domain resource allocation as indicated in the RAR UL grant together with the additional (second) $k_2$, j, or $\Delta$ value. Other wireless devices 22 including legacy wireless devices 22 (e.g., "normal" wireless devices 22) may ignore the second $k_2$, j, or $\Delta$ value and only consider the first value for its PUSCH time domain resource allocation. The network node 16 such as via one or more of processing circuitry 68, processor 70, radio interface 62, signaling unit 32, etc., by default may detect PUSCH transmission (e.g., by DMRS detection) according to the time domain resource allocation corresponding to the first total slot offset value. If the network node 16 such as via one or more of processing circuitry 68, processor 70, radio interface 62, signaling unit 32, etc., does not detect PUSCH transmission, the network node 16 may attempt the second offset value.

One or more of the methods described above are also applicable for MsgA PUSCH transmission.

Therefore, one or more embodiments, described herein provide one or more methods of an early indication in Msg1 or/and Msg3 to the network node 16 that the wireless device 22 is a RedCap wireless device 22 (Reduced Capability wireless device 22), where a determination as to whether to include the indication in Msg1 and/or Msg3 may be based on a predefined criterion or criteria, as described herein.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

EMBODIMENTS

Embodiment A1. A network node configured to communicate with a wireless device (WD), the network node configured to, and/or comprising a radio interface and/or comprising processing circuitry configured to:
 receive a reduced capability, RedCap, indication in at least one of message 1, Msg1, and message 3, Msg3; and
 perform at least one action based at least on the indication.

Embodiment A2. The network node of Embodiment A1, wherein the processing circuitry is configured to indicate, in system information, SI, that RedCap physical random access channel, PRACH, resources have been configured.

Embodiment A3. The network node of Embodiment A1, wherein if the indication is received in Msg1, one of:
 receiving the indication in the Msg3 indicates a RedCap type; and
 failing to receive the Msg3 indicates the wireless device is a non-RedCap wireless device.

Embodiment B1. A method implemented in a network node, the method comprising:
 receiving a reduced capability, RedCap, indication in at least one of message 1, Msg1, and message 3, Msg3; and
 performing at least one action based at least on the indication.

Embodiment B2. The method of Embodiment B1, further comprising indicating, in system information, SI, that RedCap physical random access channel, PRACH, resources have been configured.

Embodiment B3. The method of Embodiment B1, wherein if the indication is received in Msg1, one of:
 receiving the indication in the Msg3 indicates a RedCap type; and
 failing to receive the Msg3 indicates the wireless device is a non-RedCap wireless device.

Embodiment C1. A wireless device (WD) configured to communicate with a network node, the WD configured to, and/or comprising a radio interface and/or processing circuitry configured to:
 determine to include a reduced capability, RedCap, indication in at least one of message 1, Msg1, and message 3, Msg3; and transmit the at least one of the Msg1 and Msg3 with the RedCap indication based on the determination.

Embodiment C2. The WD of Embodiment C1, wherein the determination to include the RedCap indication in at least one of Msg1 and Msg3 is based on a predefined criterion, the predefined criterion including at least one of:
whether radio frequency, RF, returning is needed at the wireless device; based at least on a number of synchronization signal blocks, SSBs, per random access channel occasion, RO;
a quantity of contention-based (CB) preambles per SSB; and
a coverage estimation.

Embodiment C3. The WD of Embodiment C1, wherein the processing circuitry is configured to receive an indication whether to the wireless device is to transmit the RedCap indication in the one of the Msg1 and Msg3, the indication being provided by one of:
whether a physical random access channel, PRACH, partition for RedCap wireless devices has been configured; and system information, SI.

Embodiment D1. A method implemented in a wireless device (WD), the method comprising:
determining to include a reduced capability, RedCap, indication in at least one of message 1, Msg1, and message 3, Msg3; and
transmitting the at least one of the Msg1 and Msg3 with the RedCap indication based on the determination.

Embodiment D2. The method of Embodiment D1, wherein the determination to include the RedCap indication in at least one of Msg1 and Msg3 is based on a predefined criterion, the predefined criterion including at least one of:
whether radio frequency, RF, returning is needed at the wireless device; based at least on a number of synchronization signal blocks, SSBs, per random access channel occasion, RO;
a quantity of contention-based (CB) preambles per SSB; and
a coverage estimation.

Embodiment D3. The method of Embodiment D1, further comprising receiving an indication whether to the wireless device is to transmit the RedCap indication in the one of the Msg1 and Msg3, the indication being provided by one of:
whether a physical random access channel, PRACH, partition for RedCap wireless devices has been configured; and
system information, SI.

The invention claimed is:

1. A method implemented in a wireless device, the method comprising:
receiving an indication whether the wireless device is to provide a reduced capability, RedCap, indication via a message 1 of a random access procedure, wherein the indication whether the wireless device is to provide a RedCap indication via the message 1 is provided by whether a physical random access channel, PRACH, partition between RedCap wireless devices and other wireless devices is configured;
determining whether to provide a RedCap indication via the message 1 of the random access procedure based on the received indication;
transmitting the message 1 based on the determination; and
transmitting a message 3 of the random access procedure, a RedCap indication being provided via the message 3 at least if a RedCap indication is not provided via the message 1.

2. The method of claim 1, wherein the indication whether the wireless device is to provide a RedCap indication via the message 1 is received via system information.

3. The method of claim 1, wherein the wireless device provides a RedCap indication via the message 1 by selecting, for the message 1, a PRACH resource configured for RedCap wireless devices.

4. The method of claim 1, wherein a RedCap indication is also provided via the message 3 if a RedCap indication is provided via the message 1.

5. The method of claim 1, wherein a RedCap indication is provided via the message 3 using information from another protocol layer than radio resource control, RRC.

6. The method of claim 5, wherein a RedCap indication is provided via the message 3 using a medium access control, MAC, protocol layer.

7. The method of claim 1, wherein the wireless device has reduced capability compared to Third Generation Partnership Project, 3GPP, Release 15 New Radio, NR, wireless devices.

8. The method of claim 7, wherein the reduced capability includes one or more of:
reduced wireless device bandwidth;
reduce number of wireless device transmit/receive antennas;
half duplex frequency division duplex;
relaxed wireless device processing time; and
relaxed wireless device processing capability.

9. A wireless device configured to communicate with a network node, the wireless device comprising a radio interface and processing circuitry configured to:
receive an indication whether the wireless device is to provide a reduced capability, RedCap, indication via a message 1 of a random access procedure, wherein the indication whether the wireless device is to provide a RedCap indication via the message 1 is provided by whether a physical random access channel, PRACH, partition between RedCap wireless devices and other wireless devices is configured;
determine whether to provide a reduced capability, RedCap, a RedCap indication via the message 1 of the random access procedure based on the received indication;
transmit the message 1 based on the determination; and
transmit a message 3 of the random access procedure, a RedCap indication being provided via the message 3 at least if a RedCap indication is not provided via the message 1.

10. A method implemented in a network node, the method comprising:
indicating whether a wireless device is to provide a reduced capability, RedCap, indication via a message 1 of a random access procedure, wherein the indication whether the wireless device is to provide a RedCap indication via the message 1 is provided by whether a physical random access channel, PRACH, partition between RedCap wireless devices and other wireless devices is configured;
receiving the message 1 of the random access procedure;
receiving a message 3 of the random access procedure;
performing at least one action based on a RedCap indication provided via one or more of the message 1 and the message 3, a RedCap indication being provided via the message 3 at least if a RedCap indication is not provided via the message 1.

11. The method of claim 10, wherein a RedCap indication is provided via the message 1 by use of a PRACH resource configured for RedCap wireless devices.

12. The method of claim 10, wherein a RedCap indication is also provided via the message 3 if a RedCap indication is provided via the message 1.

13. The method of claim 10, wherein a RedCap indication is provided via the message 3 using a medium access control, MAC, protocol layer.

14. The method of claim 10, wherein the at least one action includes:
applying coverage compensation for scheduling of message 2 and message 3 of the random access procedure if a RedCap indication is provided via the message 1.

15. The method of claim 10, wherein the message 1 and message 3 are received from the wireless device, and wherein the at least one action includes one or more of:
scheduling the wireless device; and
restricting access for the wireless device.

16. A network node configured to communicate with a wireless device, the network node comprising a radio interface and processing circuitry configured to:
indicate whether the wireless device is to provide a reduced capability, RedCap, indication via a message 1 of a random access procedure, wherein the indication whether the wireless device is to provide a RedCap indication via the message 1 is provided by whether a physical random access channel, PRACH, partition between RedCap wireless devices and other wireless devices is configured;
receive the message 1 of the random access procedure; and
receive a message 3 of the random access procedure;
perform at least one action based on a RedCap indication provided via one or more of the message 1 and the message 3, a RedCap indication being provided via the message 3 at least if a RedCap indication is not provided via the message 1.

* * * * *